United States Patent [19]

Radomski

[11] 4,363,067
[45] Dec. 7, 1982

[54] TRANSISTOR CHOPPER PROTECTION CIRCUIT

[75] Inventor: Thomas A. Radomski, Utica, Mich.

[73] Assignee: General Motors Corporation, Detroit, Mich.

[21] Appl. No.: 157,821

[22] Filed: Jun. 9, 1980

[51] Int. Cl.³ .............................................. H02H 7/20
[52] U.S. Cl. ........................................ 361/91; 361/88;
361/111; 363/20; 363/124; 307/253; 307/240
[58] Field of Search ....................... 361/91, 88, 90, 89,
361/110, 111, 56; 363/20, 21, 34, 37, 124, 127,
131, 50, 55, 56, 57, 58, 41; 307/252 M, 253, 252
J, 240, 314, 542

[56] References Cited

U.S. PATENT DOCUMENTS 3,571,614 3/1971 Rolstead ........................ 307/253 X
3,599,077 8/1971 Lohrmann .................... 307/240 X
3,736,495 5/1973 Calkin et al. .
4,010,387 3/1977 Akamatsu ......................... 361/91 X
4,052,625 10/1977 Cameron ......................... 361/23 X
4,268,898 5/1981 Brown .................................. 363/20

FOREIGN PATENT DOCUMENTS 2015291 9/1979 United Kingdom .

OTHER PUBLICATIONS

"Switching Stress Reduction in Power Transistor Converters", by Undeland, IAS, 1976, Paper 14-B, pp. 383-392, (IAS-Industry Applications Society).

Primary Examiner—Patrick R. Salce
Attorney, Agent, or Firm—Mark A. Navarre

[57] ABSTRACT

A circuit for protecting the transistor of a high current transistor chopper from damage due to inductive energy stored in the chopper circuit when the transistor is biased nonconductive. The inductive energy charges a capacitor connected in parallel with the transistor, and a return circuit returns the energy stored in the capacitor to the source while the transistor is nonconductive and to the load when the transistor is subsequently biased conductive.

4 Claims, 6 Drawing Figures

TRANSISTOR CHOPPER PROTECTION CIRCUIT

This invention relates to high current DC chopper circuits, and more particularly to transistor chopper circuits wherein the transistor is protected from damage due to inductive over-voltage at turn-off.

DC chopper circuits generally comprise a solid state switch for controlling the application of a source of direct current to a load. The solid state switch is typically either a silicon controlled rectifier (SCR) or a power transistor. For many applications the transistor chopper is considered to be superior to the SCR chopper since the transistor chopper may be operated at higher frequencies and since a commutation network is unnecessary. However, the transistor chopper must include a protection circuit to prevent destruction of the transistor due to inductive over-voltage at turn-off unless the transistor is designed to withstand the turn-off voltages. In many high current applications, such as operating electric vehicle traction motors, transistors capable of withstanding the large turn-off voltages may not even be available. Various transistor protection circuits are disclosed in the prior art but such circuits are generally inefficient in operation and therefore not suitable for high current applications.

Accordingly, it is an object of this invention to provide a transistor chopper circuit for controlling the application of power from a DC source to an electrical load wherein inductive energy stored in the source and the chopper circuit at transistor turn-off is absorbed to protect the transistor and returned (1) to the DC source while the transistor is turned off, and (2) to the electrical load when the transistor is subsequently turned on.

It is a further object of this invention to provide a multiple phase transistor chopper circuit for controlling the application of power from a DC source to an electrical load wherein inductive energy stored in the source and in the chopper circuit at the turn-off of a transistor associated with a respective phase is returned to the electrical load when the transistor of another phase is subsequently turned on.

These objects are carried forward with a protection network comprising a steering diode, a catch capacitor, and an energy return circuit path. The inductive energy stored in the chopper circuit when the transistor is turned off is diverted by the steering diode to charge the catch capacitor, and the return circuit permits the energy thereby stored in the catch capacitor to be used for charging the battery while the transistor is turned off and for energizing the load when the transistor is subsequently turned on. According to various embodiments, the return circuit may comprise an inductor or the series combination of an inductor and a diode.

According to a further embodiment, current is supplied to the load through a multiple phase transistor chopper having a protection network associated with each phase. In this case, the inductive energy stored in a respective catch capacitor is substantially reduced so that most of the energy stored therein is returned to the load (through another phase transistor) rather than to the source. Increased efficiency is thereby achieved since charge/discharge losses in the DC source are substantially reduced.

Figure 1:
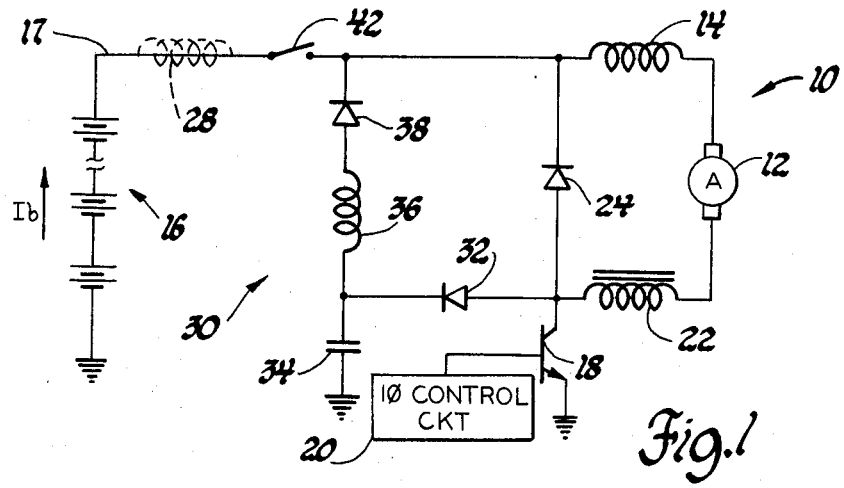
FIG. 1 is a circuit diagram of a single-phase transistor chopper made in accordance with a first embodiment of this invention.

Referring now to FIG. 1, reference numeral 10 generally designates a vehicular traction motor having an armature winding 12 and a series connected field winding 14. Alternately, a separately excited motor may be employed. Reference numeral 16 generally designates a plurality of serially connected storage batteries which provide a source of direct current for energizing motor 10 via conductor 17 and the collector-emitter circuit of power transistor 18. Switch 42 is provided in conductor 17 in order to disable the chopper circuit during periods of non-operation. The DC source 16 is comprised of twenty 12-volt batteries serially connected to provide a 240-volt supply voltage. Transistor 18 is periodically biased conductive by single phase (1) control circuit 20. It will be appreciated that the manner in which control circuit 20 operates does not form a part of this invention but that it may comprise circuitry effective to control the conduction period of transistor 18 for energizing motor 10 according to a desired schedule. Choke 22 is connected in series with traction motor 10 in order to reduce armature current ripple, and free-wheeling diode 24 is connected across traction motor 10 in a well known manner to circulate the inductive energy stored in motor 10 and choke 22 when transistor 18 is biased off. Reference numeral 28 designates a lumped inductance which represents the equivalent inductance of DC source 16 and the various circuit conductors. It will be appreciated that inductance 28 is not a physical circuit element and that its inductance value is a function of the circuit configuration and the conductor lengths. In high current applications such as delivering current to a vehicular traction motor, inductance 28 becomes a significant concern. For example, if transistor 18 switches 400 amps of load current, and inductance 28 is only 8 uH, a typical transistor turn-off duration of 1 uS could produce a 3200-volt inductive surge. This induced voltage is more than capable of destroying transistor 18 at turn-off, and the remaining circuit elements (designated generally by reference numeral 30) comprise a protection network for preventing such destruction. Diode 32 and capacitor 34 form a series circuit connected in parallel with the collector-emitter circuit of transistor 18. Diode 32 is poled in a manner to allow excessive voltages appearing at the collector of transistor 18 to charge capacitor 34 but to prevent the discharge of capacitor 34 through the collector-emitter circuit of transistor 18. Inductor 36 and diode 38 form a second series circuit for returning the energy stored in capacitor 34 following the turn-off of transistor 18 to DC source 16 and to traction motor 10. Inductor 36 operates to dampen the current passing therethrough so that the energy is returned at a substantialy constant rate. Diode 38 serves to prevent capacitor 34 from ringing to twice the supply voltage when switch 42 is initially closed. It will be appreciated, however, that diode 38 may be omitted if transistor 18 is capable of withstanding an applied voltage of this magnitude when it is first biased on.

Figure 2:
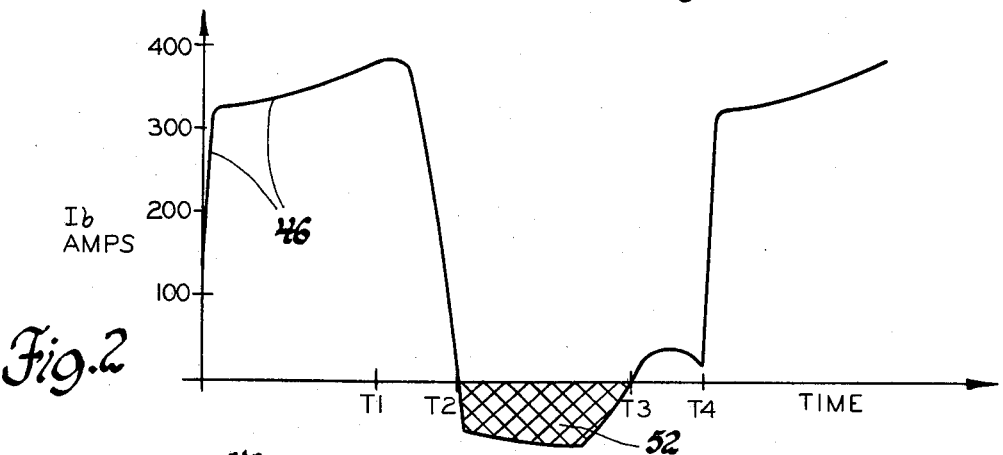
FIG. 2 is an idealized graph of battery current versus time for the chopper circuit shown in FIG. 1.

The operation of the chopper circuit illustrated in FIG. 1 will be described in reference to FIG. 2 which graphically illustrates the battery current (Ib) with respect to time. When transistor 18 is rendered conductive, energization current for traction motor 10 flows out of battery 16 as indicated by the arrow labeled Ib. Battery current (Ib) increases as a function of the circuit impedance as indicated by reference numeral 46 until transistor 18 is turned off at time T1. At this point current continues to flow out of DC source 16 due to the influence of inductance 28. During the time period T1-T2, the energy stored in inductance 28 charges capacitor 34 through a circuit path comprising battery 16, traction motor 10, choke 22, and diode 32. At time T2 capacitor 34 reaches its peak voltage and charging current begins flowing out of capacitor 34 through inductor 36 and diode 38 into the positive terminal of battery 16. Battery charging continues until time T3 when Ib swings positive again due to circuit resonance. Accordingly, shaded area 52 depicts the amount of energy that protection network 30 returns to source 16 while protecting transistor 18. At time T4, transistor 18 is biased on again and further discharges capacitor 34 through traction motor 10, completing the cycle.

Figure 3:
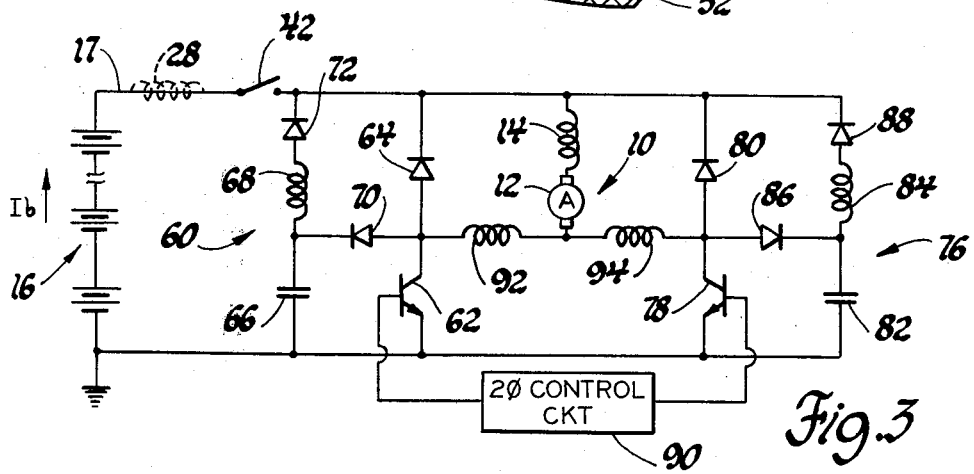
FIG. 3 is a circuit diagram of a two-phase transistor chopper made in accordance with a further embodiment of this invention.
Figure 4:
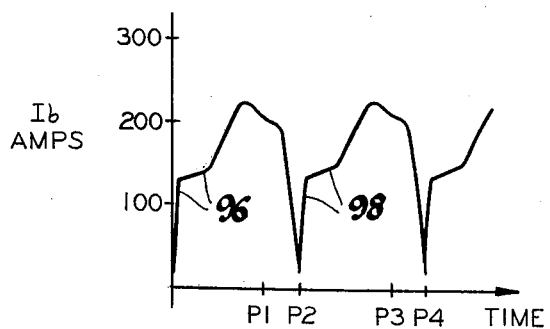
FIG. 4 is an idealized graph of battery current versus time for the transistor chopper circuit illustrated in FIG. 3.

FIGS. 3 and 4 illustrate a second embodiment of this invention employing a multiple phase transistor chopper. As illustrated in FIGS. 1 and 2, a single phase chopper circuit made in accordance with this invention energizes traction motor 10 through a single transistor 18 and returns a substantial amount of stored inductive energy to DC source 16 while transistor 18 is biased off. A multiple phase chopper, on the other hand, distributes the motor current between two or more successively actuated phases. Instead of using the inductive energy absorbed by capacitor 34 to charge DC source 16, the stored energy in a multiple phase chopper is applied directly to traction motor 10 through a power transistor associated with the other phase. For many applications it has been found that the multiple-phase chopper is preferable to the single-phase chopper since battery charge/discharge efficiency losses may be eliminated or substantially reduced, depending on the chopper duty cycle.

Specifically, FIG. 3 illustrates a two-phase transistor chopper for energizing traction motor 10, the transistor each phase being protected by a protection network such as the one illustrated in FIG. 1. Circuit elements corresponding to those depicted in FIG. 1 have been assigned the same reference numerals. A first phase designated generally by reference numeral 60 includes a power transistor 62, a free-wheeling diode 64, and a protection network comprising capacitor 66, inductor 68, and diodes 70 and 72. A second phase designated generally by reference numeral 76 includes power transistor 78, free-wheeling diode 80, and a protection network comprising capacitor 82, return inductor 84 and diodes 86 and 88. Two-phase control circuit 90 biases either or both transistors 62 and 78 to a conductive state in accordance with a selected duty cycle, whereby the current through traction motor 10 may be viewed as the sum of the current through inductors 92 and 94. It will be appreciated that the manner in which control circuit 90 operates does not form a part of this invention, but that it may comprise circuitry effective to control the conduction periods of transistors 62 and 78 for energizing motor 10 according to a desired schedule. The conduction periods are typically equal in duration and 180° out of phase with each other—they may or may not overlap, depending upon their duration. Inductors 92 and 94 function to reduce armature current ripple so that the average current supplied to motor 10 is substantially the same as for the single-phase chopper described in reference to FIGS. 1 and 2.

The operation of the chopper circuit illustrated in FIG. 3 will now be described in reference to FIG. 4 which graphically illustrates the battery current (Ib) with respect to time for the same load point conditions as in FIG. 2. When transistor 62 is rendered conductive, DC source 16 supplies energization current for traction motor 10 through field winding 14, armature winding 12, inductor 92 and the collector-emitter circuit of transistor 62. Battery current increases as illustrated by reference numeral 96 as a function of the circuit impedance until transistor 62 is biased nonconductive at time P1. It should be noted that the battery current at transistor turn-off for the two-phase chopper circuit is substantially less than for the single-phase chopper circuit, decreasing inductive stress at turn-off. Accordingly, the energy stored in catch capacitors 66 and 82 is correspondingly reduced, and the size of the various elements in the protection networks may be decreased. When transistor 62 is biased nonconductive, the inductive energy stored in inductance 28 charges capacitor 66 through diode 70 and motor 10. It should be noted that for the load point illustrated in FIG. 4, no energy is returned to source 16. Rather, the energy stored in capacitor 66 is returned solely to traction motor 10 when second-phase transistor 78 is biased conductive at time P2. It will be appreciated that for short duty-cycles (less than 20%) a small amount of the energy stored in capacitor 66 may be returned to DC source 16 due to circuit resonance as in FIG. 2 between time periods T2 and T3. However, the amount of energy returned to source 16 would be much less than is returned with the single-phase circuit since much less energy is stored in the catch capacitor of the two-phase circuit. Battery current rises from time P2 as indicated by reference numeral 98 until transistor 78 is biased nonconductive at time P3. The energy stored in inductance 28 charges capacitor 82 through diode 86 upon turn-off of transistor 78, and the energy thereby stored in capacitor 82 is returned to traction motor 10 through transistor 62 at time P4 when transistor 62 is biased to a conductive state. It will be appreciated that if the conduction periods of transistors 62 and 78 overlap, the energy stored in the catch capacitor 66 or 82 associated with the transistor 62 or 78 that is first biased to a nonconductive state will be returned to motor 10 through the conducting transistor 62 or 78 as soon as the voltage across the respective catch capacitor is sufficient to forward bias its associated diode 72 or 88.

Figure 5:
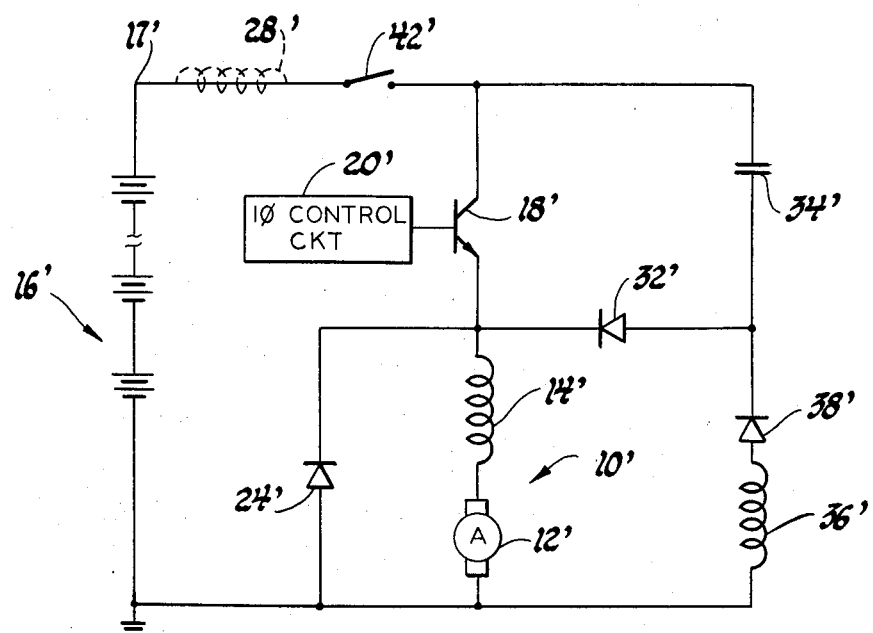
FIGS. 5 and 6 are circuit diagrams of single and two-phase choppers in an alternate circuit configuration.
Figure 6:
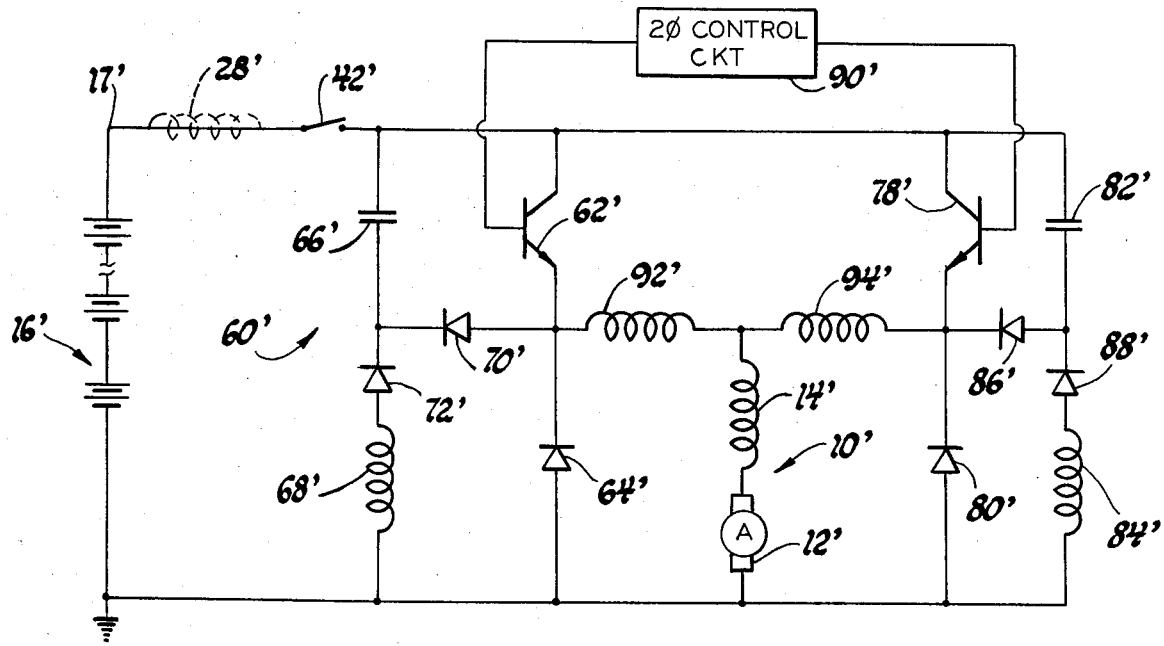

FIGS. 5 and 6 illustrate alternate chopper circuit arrangements in which the power transistor(s) is (are) connected between the motor and the positive terminal of source 16 in lieu of the circuit arrangements illustrated in FIGS. 1 and 3. For certain applications the alternate circuit arrangement may be desired, and the protection circuit of this invention works equally well with either arrangement. The reference numerals used in FIGS. 5 and 6 are primed but otherwise correspond directly to the reference numerals used in FIGS. 1 and 3, respectively.

Although FIGS. 3 and 6 illustrate two-phase transistor choppers, the protection network of this invention equally applies to a transistor chopper having three or more phases. It will be appreciated, of course, that the optimum design for a given application involves at trade off between system efficiency and circuit complexity. It will also be appreciated that the NPN power transistors shown might be replaced with PNP transistors, although such replacement is thought to be unlikely due to the limited power handling capability of currently available PNP transistors.

While it will be appreciated that various component values may be used depending upon the application, the circuit values according to the preferred embodiment of this invention (with reference to FIG. 1) are as follows:
Source 16—240 volts DC
Inductor 36—169 uH
Capacitor 34—150 uF
Transistor 18—Toshiba 2SD648

While specific embodiments have been illustrated in order to fully disclose this invention, it will be understood that this invention is not limited thereto and that various modifications may be made therefrom without departing from its spirit and scope.

The embodiments of the invention in which an exclusive property or privilege is claimed are defined as follows:

1. A chopper circuit comprising in combination:
    a transistor, an electrical load and a source of direct voltage connected in series;
    means connected to said transistor for biasing it conductive and nonconductive to connect and disconnect said source and said load;
    a series circuit comprising a capacitor and a diode connected in parallel with the emitter-collector circuit of said transistor, said diode being connected to a junction between said transistor and said load to establish a charging path for said capacitor, said charging path comprising said source of direct voltage, said diode and said electrical load, whereby upon biasing said transistor nonconductive, said capacitor absorbs inductive energy stored in said chopper circuit to protect said transistor from transient inductive voltage surges;
    a return circuit including an inductor having inductance substantially in excess of stray circuit inductance connected between said source of direct voltage and a junction between said diode and said capacitor for returning energy stored in said capacitor to said source of direct voltage when said transistor is biased nonconductive and to said electrical load when said transistor is subsequently biased conductive, said inductor being operative to dampen the current of the return energy.

2. A chopper circuit for supplying power to an electrical load comprising in combination:
    a source of direct voltage defining first and second voltage potentials;
    conductor means connecting said first voltage potential to said electrical load;
    a transistor having its emitter-collector circuit connected between said electrical load and said second voltage potential;
    means connected to said transistor for biasing it conductive and nonconductive to connect and disconnect said source and said electrical load;
    a series circuit comprising a capacitor and a first diode connected in parallel with the emitter-collector circuit of said transistor, said first diode being connected to a junction between said transistor and said electrical load to establish a charging path for said capacitor comprising said source, said diode and said electrical load, whereby upon biasing said transistor nonconductive said capacitor absorbs inductive energy stored in said source and said conductor means to thereby protect said transistor from transient inductive voltage surges;
    a return circuit comprising an inductor having inductance in substantial excess of stray circuit inductance and a second diode connected in series between said conductor means and a junction between said first diode and said capacitor for returning the energy stored in said capacitor to said source of direct voltage when said transistor is biased nonconductive and to said electrical load when said transistor is subsequently biased conductive, said inductor being operative to dampen the current of the return energy.

3. A transistor chopper for controlling the energization of a direct current motor comprising:
    a source of direct voltage defining first and second voltage potentials, conductor means connecting said first voltage potential to one side of said motor, a transistor having a control electrode and first and second current carrying electrodes, a first circuit junction connected to said first current carrying electrode and to the other side of said motor, means connecting said second current carrying electrode to said second voltage potential, means connected to said control electrode of said transistor for biasing it on and off to connect and disconnect said source and said motor, a first diode connected in parallel with said motor, said first diode being poled in a manner to circulate inductive energy stored in said motor when said transistor is biased off, a capacitor connected between a second circuit junction and said second voltage potential, a second diode connected between said first circuit junction and said second circuit junction in a manner to establish a charging circuit for said capacitor comprising said source, said second diode, and said motor, whereby said capacitor is effective when said transistor is biased off to absorb inductive energy stored in said source and said conductor means to protect said transistor from transient inductive voltage surges, a series circuit comprising a third diode and an inductor having inductance in substantial excess of stray circuit inductance connected between said second circuit junction and said conductor means, said third diode being poled in a manner to discharge the energy stored in said capacitor through said inductor to said source and said motor so that the inductive energy stored in said capacitor after said transistor is biased off is returned to said source of direct voltage while said transistor remains biased off and to said motor when said transistor is subsequently biased on, said inductor being operative to dampen the current of the return energy so that such energy is returned at a substantially constant rate.

4. A multiphase transistor chopper comprising:

an electrical load;

a source of direct voltage defining first and second voltage potentials;

conductor means connecting said first voltage potential to one side of said load;

a multiplicity of phase circuits connected in parallel between the other side of said load and said second voltage potential, each of said phase circuits comprising a serially connected transistor and summing inductor;

multiphase control means connected to said transistors for selectively biasing said transistors on and off to connect and disconnect said source and load;

a protection circuit for each of said transistors comprising a serially connected diode and capacitor connected in parallel with the emitter-collector circuit of a respective transistor, each diode being connected to a junction between said respective transistor and said load to establish a charging path for said capacitor comprising said source, said diode and said load whereby said capacitor is effective to absorb inductive energy stored in said source and said conductor means when the respective transistor is biased off to thereby protect the respective transistor from damage due to transient inductive over voltage; and a return circuit including an inductor having inductance in substantial excess of stray circuit inductance for each of said protection circuits, each return circuit being connected between said conductor means and a junction between a respective protection circuit diode and capacitor so that energy stored in a protection circuit capacitor following the turning off of a respective transistor is returned to said load through another of said transistors, the inductor in each protection circuit being operative to dampen the current of the return energy so that such energy is returned at a substantially constant rate.

* * * * *